United States Patent Office 3,216,973
Patented Nov. 9, 1965

1

3,216,973
POLYURETHANE PLASTICS MADE WITH A TRIOL BEARING STRICTLY SECONDARY HYDROXYL GROUPS
J W. Britain, Hillside, New Martinsville, W. Va., assignor to Mobay Chemical Company, Pittsburgh, Pa., a corporation of Delaware
No Drawing. Filed Nov. 16, 1961, Ser. No. 152,913
8 Claims. (Cl. 260—77.5)

This invention relates to a method for preparing elastomeric polyurethane plastics and more particularly to an improvement in the method which comprises reacting the components of a polyurethane elastomeric material to a partially cured state and then subsequently finally curing by the application of heat while the particular product is being formed generally under pressure. This process is generally referred to as the green stock process.

It has been heretofore known to prepare elestomeric polyurethane plastics by the so called green stock process wherein an organic compound containing active hydrogen atoms capable of reacting with an —NCO group such as, for example, polyesters and polyethers is mixed with an organic polyisocyanate and a cross-linking agent, pouring the mixture onto a heated table where they are permitted to react and harden, removing the hardened mass from the table and subsequently processing the hardened material which may or may not be reduced in size under heat and pressure into the desired configuration.

It has also been suggested to utilize a mixture of a difunctional organic compound containing active hydrogen atoms with a polyhydric alcohol having a functionality greater than two to obtain a product having a molecular weight per branch point between 5,000 and 100,000, which products have outstanding properties with respect to tensile strength, elongation, modulus and tear strength, but also with respect to compression and elongation set and resistance to solvents. This process, however, requires, a close amount of supervision during the preparation of the green stock because of the presence of the highly reactive trifunctional material which will cause the rapid cross linking of the polymer if the removal from the heated table is not timely and if the reaction is not slowed down by cooling. That is, after mixing, for example, a polyester, a diisocyanate and a chain extender containing a quantity of a triol, for example, such as, trimethylol propane and pouring it onto a heated table, the reaction will proceed rapidly and prevent the further working of the material into the desired configuration by a process such as, extrusion or injection molding if the material is not removed from the table before the reaction proceeds too far. Further, the storage time before subsequent fabrication is seriously limited because even at ambient temperatures, some cross-linking will take place.

It is, therefore, an object of this invention to provide an improved process for the preparation of polyurethane plastics. It is another object of this invention to provide an improvement in the green stock method of preparing polyurethane plastics. It is still another object of this invention to provide an improved method of preparing polyurethane plastics by the green stock process wherein close supervision of the procedural steps is not required. It is a further object of this invention to provide a simplified method of preparing elastomeric polyurethane plastics, the products resulting therefrom exhibiting properties equivalent to those heretofore known. It is a still further object of this invention to provide a green stock which has a long shelf life.

The foregoing objects and others which will become apparent from the following description are accomplished in accordance with the invention, generally speaking, by providing an improvement in the green stock method of preparing elastomeric polyurethanes which comprises reacting as the cross-linking agent a mixture of a difunctional organic compound containing active hydrogen atoms capable of reacting with —NCO groups and an organic compound containing three secondary hydroxyl groups as the sole groups reactive with —NCO groups to obtain a final product having a molecular weight per branch point of from about 5,000 to about 100,000. More particularly, the method of this invention is carried out by mixing an organic compound containing active hydrogen atoms capable of reacting with —NCO groups and having a molecular weight of at least about 600 with an organic diisocyanate and a mixture of a difunctional chain extender selected from glycols, diamines and amino alcohols and a quantity of a trihydric alcohol containing as its sole groups reactive with —NCO groups, secondary hydroxyl groups such that the molecular weight per branch point of the resulting elastomeric product is from about 5,000 to about 100,000, conducting the reactive mixture onto a heated table or onto a heated tray in an oven where it solidifies, removing the resulting solid from the table or oven and subsequently fabricating the solid material into the desired configuration by the application of heat and pressure.

In the method of preparing polyurethane elastomers by the green stock process utilizing a mixture of a difunctional chain extender and a polyfunctional alcohol having more than two hydroxyl groups, close supervision of the process is required because the hydroxyl groups present in the reaction mixture which makes up the cross-linking agent are substantially all primary hydroxyl groups and, therefore, have the same reactivity. It can thus be seen that cross-links and branching will occur as readily as linear chain extension depending of course, on the respective quantities of difunctional and trifunctional material. This requires the stopping or slowing down of the reaction before it can proceed beyond the point where the material can no longer be fabricated by the application of heat and pressure. Further, care in storage must be taken to provide ample shelf life to permit subsequent processing into a finished article at the desired time.

In accordance with the process of this invention an amount of a trihydric alcohol having only secondary hydroxyl groups is used such that the molecular weight per branch point will be from about 5,000 to about 100,000 and preferably from about 10,000 to about 50,000 and even more preferably about 25,000. The heat cured products prepared using an amount of trihydric alcohol containing only secondary hydroxyl groups within the molecular weight per branch point range set forth, exhibit the combination of high tensile strength, elongation, modulus and tear strength with low compression elongation set and high resistance to the action of solvents with the additional advantage of ease of processing and storing of the uncured polymer.

To obtain the required molecular weight per branch point the trihydric alcohol having only secondary hydroxyl groups should be present in an amount of from about 0.2 to about 10 parts by weight per 100 parts of the organic compound containing active hydrogen atoms and having a molecular weight of at least 600 and preferably from about 0.4 to about 1.2 parts by weight per 100 parts of the organic compound having a molecular weight of at least 600 for a trihydric alcohol having a molecular weight of about 400. The amount of the trihydric alcohol necessary can also be expressed as being from about 0.0005 mol to about 0.025 mol and perferably from 0.001 mol to about 0.013 mol per 100 parts of the active hydrogen containing compound having a molecular weight of at least 600.

By molecular weight per branch point is meant the average molecular weight for each branch point in the polymer. By branch point is meant a point in the polymer where more than one chain meets such as Y. For purposes of calculation, the molecular weight per branch point is equal to the total molecular weight of the reacted product divided by the number of mols of the trihydric alcohol containing secondary hydroxyl groups corrected for any deviation of the —NCO to total —OH ratio from 1.0. Thus, for example, where the total weight is 20,000 and one mol of trihydric alcohol containing secondary hydroxyl groups is used in the preparation thereof, the molecular weight per branch point will be 20,000 and the isocyanate is exactly equivalent to all of the functional groups in the active hydrogen compound.

In accordance with this invention any suitable trihydric alcohol containing secondary hydroxyl groups as the sole groups reactive with — NOC groups may be used such as, for example, 1,3,5-trihydroxycyclohexane, the reaction product of compounds containing three active hydrogen atoms with at least three mols of an alkylene oxide which forms secondary hydroxyl groups upon addition porlymerization, fatty acid triglycerides which contain three secondary hydroxyl groups such as, castor oil, the triglycerides of blown "heavy body" drying oils including blown tung, linseed, poppyseed, hempseed, soya and the like, polyesters prepared by reacting a trihydric alcohol with an hydroxy carboxylic acid where the hydroxyl group is a secondary hydroxyl group such as, for example, lactic acid, hydroxybutyric acid, hydroxyvaleric acid, hydroxycaproic acid, mandelic acid and the like. Suitable trihydric alcohols useful in the preparation of polyesters containing secondary hydroxyl groups include such as, for example, trimethylolpropane, glycerine, trimethylolethane, 1,2,6-hexanetriol and the like. In the preparation of trihydric alcohols containing secondary hydroxyl groups as the sole groups reactive with the —NCO groups, any compound containing three active hydrogen atoms that will react with an alkylene oxide which forms secondary hydroxyl groups upon addition polymerization may be used such as, for example, amminia, hydroxyl amine, trihydric alcohols including those mentioned above with respect to the preparation of polyesters, amino alcohols and amino phenols such as, for example, aminoethyl alcohol, aminopropyl alcohol, aminobutyl alcohol, aminoamyl alcohol, aminocyclohexyl alcohol, aminophenol, aminocresol aminoxylylene alcohol and the like. Any suitable alkylene oxide which gives secondary hydroxyl groups upon addition polymerization may be used in reaction with a compound having three active hydrogen atoms to produce secondary trihydric alcohols to be used in accordance with this invention, such as, for example, propylene oxide, butylene oxide, styrene oxide and the like. At least three mols of alkylene oxide must be present for each compound containing active hydrogen atoms to produce a compound having three secondary hydroxyl groups. Of course, quantities higher than three mols may be used in which case higher polymers are formed. A specific example of such a compound is one formed by reacting one mol of trimethylol propane with five mols of propylene oxides.

In the preparation of the polyurethane plastics in accordance with this invention, any suitable organic compound containing active hydrogen atoms as determined by the Zerewitinoff method, capable of reacting with –NCO groups and having a molecular weight of at least about 600 may be used as, for example, hydroxyl polyesters prepared by reacting dihydric alcohols and dicarboxylic acids, polyhydric polyalkylene ethers and polyhydric polythioethers.

Any suitable hydroxyl polyester may be used such as, for example, the reaction product of a dicarboxylic acid and a dihydric alcohol. Any suitable dicarboxylic acid or mixture thereof may be used in the preparation of polyesters such as, for example, adipic acid, succinic acid, suberic acid, sebacic acid, oxalic acid, methyladipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid and the like. Any suitable dihydric alcohol or mixture thereof may be used in the reaction with the dicarboxylic acid to form a polyester such as, for example, ethylene glycol, butylene glycol, hexanediol, bis-(hydroxy-methyl-cyclohexane), 1-4-butanediol, diethylene glycol, 2,2-dimethyl propylene glycol, 1,3-propylene glycol and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257 to 262 published in Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide, 4,4'-dihydroxy butylsulfide, 1,4-(β-hydroxy ethyl) phenylene dithioether and the like.

The organic compounds containing active hydrogen containing groups suitable for use in the process of this invention should have a molecular weight of at least about 600, an hydroxyl number of from about 20 to about 190 and preferably between about 30 and about 70 and an acid number of less than about 2.

Any suitable organic diisocyanate may be used in the process of this invention such as, for example, aliphatic diisocyanates, aromatic diisocyanates, alicyclic diisocyanates and heterocyclic diisocyanates including such as, for example, ethylene diisocyanate, ethylidene diisocyanate, propylene diisocyanate, butylene diisocyanate, cyclopentylene-1,3 - diisocyanate, cyclohexylene-1,4-diisocyanate, cyclohexylene-1,2-diisocyanate, 2,4-tolylene diisocyanate, 2,6-tolylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate and the like. The isocyanate is used in an amount such that the —NCO to —OH ratio of the reactive system is from about 0.95 to about 1.15. For best physical properties, however, the isocyanate is used in excess over the amount necessary to react with the compounds containing active hydrogen atoms and preferably in an amount such that the —NCO to —OH ratio is from about 1.01 to about 1.15. However, if a whiter, more non-yellowy polymer is preferred at the slight expense of physical properties such as tensile strength, tear strength, and elongation set, then the isocyanate is used in insufficient amount to react with all of the compounds containing active hydrogen atoms and preferably in an amount such that the —NCO to —OH ratio is from about 0.95 to 1.00.

Any suitable difunctional chain extending agent having active hydrogen containing groups reactive with isocyanate groups and a molecular weight less than about 300 may be used such as, for example, diols including ethylene glycol, propylene glycol, butylene glycol, 1,4-butanediol, butenediol, butynediol, xylylene glycols, amylene glycols, 1,4-phenylene-bis-β-hydroxy ethyl ether, 1,3-phenylene-bis-β-hydroxy ethyl ester, bis-(hydroxy-methylcyclohexane), hexanediol, thiodiglycol, and the like; diamines including ethylene diamine, propylene diamine, butylene diamine, hexamethylene diamine, cyclohexylene diamine, phenylene diamine, tolylene diamine, xylylene diamine, 3,3′-dichlorobenzidine, 3,3′-dinitrobenzidine and the like; alkanol amines such as, for example aminoethyl alcohol, ethanolamine aminopropyl alcohol, 2,2-dimethyl propanol amine, 3-aminocyclohexyl alcohol, p-amino benzyl alcohol and the like. The difunctional chain extenders mentioned in United States Patents 2,620,516, 2,621,166 and 2,729,618 may be used in practice of this invention.

Other organic compounds having reactive hydrogens suitable for reaction with the diisocyanate in accordance with this invention include all of those heretofore disclosed for this purpose such as polyacetals disclosed in U.S. Patent 2,961,428, carbon monoxide-olefin polymers disclosed in U.S. Patent 2,839,478 and the like. In fact any such compound having a molecular weight of at least 600 can be used but best results are obtained with polyesters, polyalkylene ether glycols and poly(alkylene thioether) glycols.

In the process of this invention, the reaction components that is, the polyester or other organic compounds containing active hydrogen atoms, the chain extender which is, of course, a mixture of a difunctional compound and a trihydric alcohol having secondary hydroxyl groups as its sole groups reactive with —NCO groups in an amount sufficient to obtain the desired molecular weight per branch point and the organic diisocyanate are heated individually to a temperature of from about 60° C. to about 135° C. and then simultaneously mixed together. Of course, the polyester and the chain extender may be first admixed as these compounds are inactive toward one another. In fact this method is preferred as the subsequent mixing with the isocyanate is facilitated. The organic compound containing active hydrogen atoms may also be first reacted with the diisocyanate to form a prepolymer and then this prepolymer reacted with the chain extender to the solidified form.

If the material becomes too viscous, a small amount of an acid such as, citric acid can be added to slow down the reaction. An amount of from about 0.001 to about 0.50 parts based on 100 parts of the polyester is suitable for this purpose. Of course, any suitable catalyst may be added for the purpose of increasing the rate of reaction. Any suitable catalyst such as tertiary amines, organo-tin compounds and the like may be used for this purpose. Suitable tertiary amine catalysts are set forth in the above-mentioned U.S. patents. Suitable organo-tin catalysts and the like are set forth in an article entitled, "Catalysis of the Isocyanate Hydroxyl Reaction" found on pages 207–211 of volume IV, Issue No. 11, of the "Journal of Applied Polymer Science." The reaction mixture is then immediately poured onto a heated table or flat mold which is maintained at a temperature of from about 60° C. to about 135° C. and permitted to remain thereon until solidification results and the material can be readily removed and reduced in particle size. The material at this point is thermoplastic and may be processed in the normal manner known in the art for thermoplastic resins. The material on the heated table may be cut or scored while still soft to permit the ready removal thereof, for once it becomes hard, it is more difficult to cut. The material may then be reduced in size by grinders, choppers and other conventional equipment known in the industry.

After the reaction mixture has partially reacted to form a product suitable for cutting, chopping or grinding, it is cooled to room temperature. This material may then be either stored for several weeks or it may be immediately further processed by extrusion, compression molding, injection molding or other similar techniques known in the industry.

If the green stock is to be extruded, it is placed in the hopper of the extruding device at room temperature. The temperature of the material within the extruder is maintained at from about 200 to about 450° F. The compression ratio of the screw of the extruder may be about 3:1 or higher and the screw may have a constant pitch variable root. The extruded part is then cured, for example, for 12 to 24 hours at 100 to 110° C.

If the green stock which has been chopped into chunks is to be compression molded, the chunks are placed in a suitable mold which is preheated to a temperature of from about 150° F. to about 400° F. They are then pressed under high pressure for about 2 minutes and the mold is then cooled to a temperature below about 150° F. while the pressure is still being applied. After the temperature has fallen below about 150° F., the mold is removed from the press and cooled and the sample removed. The sample is then further cured, for example, for 12 to 24 hours at 110° C.

When the injection molding technique is used in the manufacture of molded articles by the process of this invention, the cylinder of the injection device through which the material is forced into the mold cavities is maintained at a temperature of from about 200° F. to about 500° F. The mold cavities themselves are not heated and the molded articles are removed from the cavities from about 5 seconds to about 20 seconds after the green stock is injected therein. The articles may then, if desired, be subjected to a post-curing technique which is a stoving operation wherein the articles are maintained at elevated temperatures for several hours or even in some cases days.

The partially cured reaction mixture, for example, green stock, which is removed from the heated table may be stored for considerable lengths of time even at room temperature. This period of storage can be extended when refrigeration is employed.

The green stock after being removed from the heated table and extruded into filaments has high tensile strength on the order of about 5000 pounds per square inch and higher. These filaments may then be oriented by curing the extruded filament under tension. This procedure greatly increases the tensile strength of the filament. The tensile strength of an oriented filament is on the order of 13,000 pounds per square inch and higher. The elongation of such filaments is also reduced by the orientation of the filament. This orientation reduced the elongation from about 600 to about 150 percent. The elongation set of the oriented filament is about zero percent while the elongation set of a filament which has not been oriented may be about 60 percent.

The semi-cured particles which are prepared by chopping the material removed from the heated table may have incorporated therein suitable dyes and pigments to produce uniformly colored products. This permits the polyurethane material to be colored by an extrusion process and then injection molded or compression molded to obtain a uniformly colored product. This is possible for the reason that even after extruding the material, it is not finally cured and can subsequently be injection molded, compression molded or re-extruded. Fillers may also be added.

The products prepared in accordance with the invention are suitable in all types of applications where an elastomeric product is desired. Particularly suitable applications include those where vibration damping is desired such as in motor mounts and the like. The elastic filaments prepared in accordance with this invention by extrusion are suitable for weaving into garments such as, for example, girdles, elastic stockings and the like.

The invention is further illustrated by the following examples in which parts are given by weight unless otherwise specified.

*Example 1*

About 100 parts of a dihydroxy terminated polyester prepared having a molecular weight of about 2,000, an hydroxyl number of about 56 and an acid number of 1.5 and prepared by reacting 11 mols of ethylene glycol and 10 mols of adipic acid is heated to a temperature of about 100° C. and admixed with about 40 parts of 4,4'-diphenylmethane diisocyanate, about 9.2 parts of 1,4-butanediol and about 0.96 part of the reaction product of 1 mol of trimethylol propane with 5 mols of propylene oxide, each of the last three mentioned compounds being individually heated to approximately 100° C. prior to mixing. The reaction mixture is then poured onto a heated table maintained at about 100° C. where it is permitted to harden. The length of time the materials remain on the heated table may be extended several minutes beyond the time of solidification without being detrimental to the further processing of the material as the secondary hydroxyl groups are not as reactive as primary hydroxyl groups.

In a comparative example utilizing a trihydric alcohol having primary hydroxyl groups, close watch of the poured material is necessary to insure the rapid removal from the heated table just as soon as solidification occurs thereby preventing the reaction of some of the primary hydroxyl groups with the remaining isocyanate present which thus prevents the subsequent further processing of the material.

*Example 2*

About 100 parts of a dihydroxy terminated polyester prepared having a molecular weight of about 2,000 and an hydroxyl number of about 56 and an acid number of 1.5 and prepared by reacting 11 mols of 1,4-butanediol and 10 mols of adipic acid is heated to a temperature of about 60° C. and admixed with about 9.2 parts of 1,4-butanediol and about 3.3 parts of purified castor oil. 60° C. and admixed with about 40 parts of 4,4'-diphenylmethane diisocyanate also prior to mixing having been heated to a temperature of about 60° C. The reaction mixture is then poured onto a heated table maintained at about 100° C. where it is permitted to harden. The length of time the materials remain on the heated table may be extended several minutes beyond the time of solidification without being detrimental to the further processing of the material as the secondary hydroxyl groups are not as reactive as primary hydroxyl groups with isocyanates.

Although the invention has been described in considerable detail for the purpose of illustration, it is to be understood that variations may be made therein by those skilled in the art without departing from the spirit of the invention and the scope of the claims.

What is claimed is:

1. A method of making a heat curable polyurethane plastic composition which comprises mixing a polymeric glycol having a molecular weight of at least 600 with an organic diisocyanate and a mixture of a difunctional organic compound containing active hydrogen atoms which are reactive with —NCO groups, said compound having a molecular weight of less than 300 and from about 0.0005 to about 0.025 mol of a trihydric alcohol having secondary hydroxyl groups as its sole groups reactive with —NCO groups per 100 parts of the said polymeric glycol.

2. The heat curable polyurethane plastic prepared in accordance with the process of claim 5.

3. A method of making a heat curable polyurethane plastic composition which comprises mixing a polymeric glycol having a molecular weight of at least about 600 with an organic diisocyanate and a mixture of a difunctional organic compound having a molecular weight less than about 300 and containing active hydrogen atoms which are reactive with —NCO groups and a trihydric alcohol having secondary hydroxyl groups as its sole groups reactive with —NCO groups, said trihydric alcohol being present in an amount such that the molecular weight per branch point of the product is from about 10,000 to 50,000.

4. A method of making a heat curable polyurethane plastic composition which comprises mixing a polymeric glycol having a molecular weight of at least about 600 with an organic diisocyanate and a mixture of a difunctional organic compound having a molecular weight less than about 300 and containing active hydrogen atoms which are reactive with —NCO groups and a trihydric alcohol having secondary hydroxyl groups as its sole groups reactive with —NCO groups, said trihydric alcohol being present in an amount such that the molecular weight per branch point of the product is about 25,000.

5. A method of making a heat curable polyurethane plastic composition which comprises mixing a polymeric glycol having a molecular weight of at least about 600 with an organic diisocyanate and a mixture of a difunctional organic compound having a molecular weight less than about 300 and containing active hydrogen atoms which are reactive with —NCO groups and a trihydric alcohol having secondary hydroxyl groups as its sole groups reactive with —NCO groups, said trihydric alcohol being present in an amount such that the molecular weight per branch point of the product is from about 5,000 to about 100,000.

6. A method of making a heat curable polyurethane plastic composition which comprises mixing a polymeric glycol having a molecular weight of at least 600 with an organic diisocyanate and a mixture of a difunctional organic compound containing active hydrogen atoms which are reactive with —NCO groups, said compound having a molecular weight of less than 300 and from about 0.0001 mol to about 0.013 mol of a trihydric alcohol having secondary hydroxyl groups as its sole groups reactive with —NCO groups per 100 parts of the said polymeric glycol.

7. A method of making a heat curable polyurethane plastic composition which comprises mixing a polymeric glycol selected from the group consisting of polyesters, polyalkylene ethers and polythioethers, having a molecular weight of at least about 600 with an organic diisocyanate and a mixture of a difunctional organic compound having a molecular weight less than about 300 and containing active hydrogen atoms which are reactive with —NCO groups and a trihydric alcohol having secondary hydroxyl groups as its sole groups reactive with —NCO groups, said trihydric alcohol being present in an amount such that the molecular weight per branch point of the product is from about 5,000 to about 100,000.

8. The process of claim 5 wherein said polymeric glycol is a polyester.

References Cited by the Examiner

UNITED STATES PATENTS

| | | | |
|---|---|---|---|
| 2,625,531 | 1/53 | Seeger | 260—77.5 |
| 2,753,319 | 7/56 | Brockway | 260—75 |
| 3,050,482 | 8/62 | Cobb | 260—77.5 |
| 3,054,757 | 9/62 | Britain | 260—77.5 |
| 3,109,825 | 11/63 | O'Mant | 260—77.5 |

FOREIGN PATENTS

| | | |
|---|---|---|
| 1,005,721 | 4/57 | Germany. |
| 733,624 | 7/55 | Great Britain. |

LEON J. BERCOVITZ, *Primary Examiner.*